US 8,848,554 B2

(12) United States Patent
Reed

(10) Patent No.: US 8,848,554 B2
(45) Date of Patent: Sep. 30, 2014

(54) PACKET SNIFFING WITH PACKET FILTERING HOOKS

(75) Inventor: Darren Reed, Melbourne (AU)

(73) Assignee: Oracle International Corporation, Redwood Shores, CA (US)

( * ) Notice: Subject to any disclaimer, the term of this patent is extended or adjusted under 35 U.S.C. 154(b) by 152 days.

(21) Appl. No.: 13/041,626

(22) Filed: Mar. 7, 2011

(65) Prior Publication Data

US 2012/0230210 A1    Sep. 13, 2012

(51) Int. Cl.
    *H04L 12/26* (2006.01)
(52) U.S. Cl.
    CPC .............. *H04L 43/028* (2013.01); *H04L 43/12* (2013.01)
    USPC ........................................................ 370/252
(58) Field of Classification Search
    CPC ... H04W 24/00; H04L 43/50; H04L 43/0852; H04L 43/08; H04B 17/003
    USPC .......................... 370/242, 249, 252, 290, 355
    See application file for complete search history.

(56) References Cited

U.S. PATENT DOCUMENTS

| 7,769,873 B1* | 8/2010 | Mackie .......................... 709/229 |
| 8,018,943 B1* | 9/2011 | Pleshek et al. ................. 370/392 |
| 2005/0114700 A1* | 5/2005 | Barrie et al. ................... 713/201 |
| 2005/0227711 A1* | 10/2005 | Orwant et al. .............. 455/456.3 |
| 2007/0239854 A1* | 10/2007 | Janakiraman et al. ......... 709/218 |
| 2009/0254651 A1* | 10/2009 | Sheppard ....................... 709/224 |
| 2011/0093686 A1* | 4/2011 | Penton et al. ................. 712/222 |
| 2012/0079478 A1* | 3/2012 | Galles et al. ....................... 718/1 |

OTHER PUBLICATIONS

McCanne et al., The BSD Packet Filter: A New Architecture for User-Level Packet Capture, Winter USENIX—Jan. 1993—San Diego, CA, Dec. 19, 1992, pp. 1-11.
Reed et al., Packet Filtering Hooks Design Specification, Sun Microsystems, Inc., Feb. 21, 2006, pp. 1-33.

\* cited by examiner

*Primary Examiner* — Andrew Lai
*Assistant Examiner* — Zhiren Qin
(74) *Attorney, Agent, or Firm* — Kraguljac Law Group, LLC

(57) ABSTRACT

Systems, methods, and other embodiments associated with packet sniffing using packet filter hooks are described. In one embodiment, a method includes re-directing a network packet at a filter hook point in an Internet Protocol processing stack. The example method may also include re-directing the network packet to a packet sniffer.

18 Claims, 7 Drawing Sheets

PACKET SNIFFING WITH PACKET FILTERING HOOKS

BACKGROUND

Packet sniffing is the capturing of data packets to log and analyze those data packets. Packet sniffing is also known as packet analysis, packet capture and network analysis. Packet sniffing is useful for troubleshooting network problems, performing statistical analysis of network traffic and so on.

Capturing packets for the purpose of packet sniffing conventionally occurs at a low level of packet processing in a computer system. The common low-level point of capture for packet sniffing is the network interface card (NIC). When packet sniffing is performed, the NIC passes all traffic to a packet sniffing function in the computer system. Packet sniffing in this way is specific to the particular NIC and occurs by placing the NIC in a special promiscuous mode. Placing the NIC in promiscuous mode forwards every packet seen by the NIC on the network to the computer system's central processing unit rather than just frames addressed to the central processing unit. As a result of handling all traffic from the MC, the computer system experiences an increase in processor demand. This can have a negative impact on other processes in the computer system. Collecting all of the traffic also results in more data than what is necessary to efficiently perform the packet sniffing function.

Additionally, packet sniffing at the NIC captures packets at layer 2 Media Access Control (MAC) processing of the packets. Capturing packets from a layer 2 process limits information about other processes that affect packets.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. One of ordinary skill in the art will appreciate that in some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
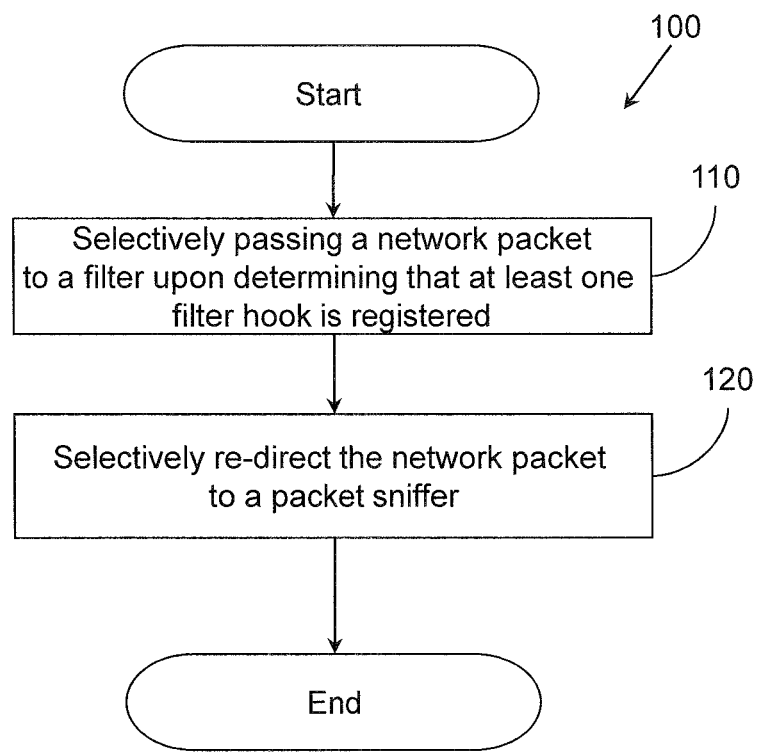
FIG. 1 illustrates one embodiment of a method associated with packet sniffing using packet filtering hooks.

Systems and methods are described herein that provide packet filter hooks for packet sniffing. In one embodiment, packet filter hooks provide greater versatility for capturing packets during packet sniffing than conventional methods. Instead of capturing packets directly at a NIC or during layer 2 processing of a packet, the present systems and methods implement packet filter hooks for capturing a packet at various points in the layer 3 Internet Protocol processing of the packet.

In one embodiment, a packet filter hook is a function call interposed between layer 3 processing functions. Placing the function call in the layer 3 processing stack between other layer 3 functions facilitates isolating various layer 3 processes. In this way, a packet sniffer uses the packet filter hooks to divert and log packets. For example, two different types of packet filter hooks may be registered, one that places a packet filter hook before and one that places a packet filter hook after a layer 3 process in the layer 3 processing stack. The packet sniffer then receives and logs packets before and after processing by the layer 3 process based on these packet filter hooks. The packet sniffer then compares the packets from before processing and after processing to facilitate diagnosing errors relating to the layer 3 process.

In one embodiment, various points in the layer 3 Internet Protocol processing of a packet are specified according to different types of packet filter hooks. Some types of packet filter hooks include a PHYSICAL_IN hook, a PHYSICAL_OUT hook, a LOOPBACK_IN hook, a LOOPBACK_OUT hook, and a FORWARDING hook.

The PHYSICAL_IN hook provides for calling a packet filter hook at a point in the layer 3 processing stack during processing of inbound network packets by the Internet Protocol kernel module.

The PHYSICAL_OUT hook provides for calling a packet filter hook at a point in the layer 3 processing stack during processing of outbound network packets by the Internet Protocol kernel module.

The FORWARDING hook provides for calling a packet filter hook at a point in the layer 3 processing stack during processing of a network packet being forwarded through the computer to a destination computer.

The LOOPBACK_IN hook provides for calling a packet filter hook in the layer 3 processing stack during processing of inbound network packets on a logical interface by the Internet Protocol kernel module.

The LOOPBACK_OUT hook provides for calling a filter hook in the layer 3 processing stack during processing of outbound network packets on a logical interface by the Internet Protocol kernel module.

In one embodiment, the layer 3 processing stack includes a plurality of predetermined packet filter hook points. Each of the predetermined packet filter hook points corresponds to one of the types of packet filter hooks. In one embodiment, packet filter hooks are registered at the predetermined packet filter hook points in the layer 3 processing stack. At each predetermined packet filter hook point a plurality of packet filter hooks may be registered for packet sniffing. Packet filter hooks may be set at each packet filter hook point to perform additional/different functions including firewalling, Network Address Translation (NAT), and so on.

In one embodiment, the packet sniffer is present in the same system as a firewall and/or a NAT function. The packet sniffer, firewall, and NAT use packet filter hooks to divert packets from layer 3 Internet Protocol processing to the packet sniffer, to the firewall, or to the NAT, respectively. In addition to using packet filter hooks at various points in the layer 3 processing stack, arranging packet filter hooks relative to each other is possible at the same filter hook point in the layer 3 processing stack.

For example, a packet filter hook(s) for packet sniffing may be arranged to occur prior to a firewall/NAT packet filter hook and/or after a firewall/NAT packet filter hook. In one example, a computer system receives a packet on a NIC and performs layer 1 and layer 2 processing of the packet. The layer 2 processing service passes the packet to a layer 3 processing service. The layer 3 processing service processes the packet using the layer 3 processing stack. The layer 3 processing stack is implemented according to a layer 3 Internet Protocol.

In one embodiment, the layer 3 processing service begins processing the packet by checking for the presence of a packet filter hook. If a packet filter hook is set at this point in the layer 3 processing stack, then the layer 3 processing service provides the packet to a filtering process. In this example, the checking involves determining whether at least one packet filter hook is registered for the packet filter hook point. In other embodiments, the layer 3 processing service may check what type of packet filter hook is set or how many packet filter hooks are set.

The filtering process receives the packet and applies the packet filter hook to the packet. If more than one packet filter hook is present, the packet is processed according to the packet filter hooks in the order they have been arranged. In the case where a packet filter hook for packet sniffing is set as the first packet filter hook, the filtering process then determines whether the packet satisfies any conditions specified by the packet filter hook. If the packet satisfies the conditions of the packet filter hook, then the filtering process forwards the packet to a packet sniffer.

The packet sniffer performs a packet sniffing routine and then releases the packet to the filtering process. If subsequent packet filter hooks are present, the filtering process performs processing of the packet according to the next packet filter hook and so on. As described previously, a packet filter hook may be a firewall packet filter hook, a NAT packet filter hook, or a packet sniffing packet filter hook. The packet is forwarded to a firewall by the filtering process if the packet filter hook is a firewall packet filter hook. The firewall will provide the packet back to the filtering process to continue applying any subsequent packet filter hooks after performing firewall processing on the packet. If no subsequent packet filter hooks are present, the filtering process sends the packet to the layer 3 processing service. The layer 3 processing service continues processing from the point in the layer 3 processing stack where it left off before forwarding the packet to the filtering process.

In one embodiment, the packet sniffer performs one or more packet sniffing routines with the packet. The packet sniffer may log, decode, and/or analyze each packet. The packet sniffing routines may include copying a predetermined part of the packet to a data storage device for later analysis, copying the whole packet to a data storage device, logging one or more attributes of the packet to a log file, detecting errors in the packet, comparing the packet to previously captured packet(s), displaying the packet to a user, and so on. The packet sniffer may also use attributes of the packet to perform statistical analysis of network traffic, and so on. The packet sniffer may use one or more of these routines to analyze packets according to a computer security or analysis plan.

With reference to FIG. 1, one embodiment of a method 100 associated with packet sniffing using packet filter hooks is illustrated. Method 100 is interposed between functions in a stack of functions for performing layer 3 processing of a network packet.

Layer 3 processing of a network packet occurs in devices involved in sending and receiving data across a network. For example, these devices may include routers, servers, firewalls, desktop computers, laptops, personal electronic devices and so on. Layer 3 processing generally refers to processing of a network packet that occurs according to the third layer of protocols in the 7-layer Open Systems Interconnection (OSI) model. In the OSI model, a layer is a collection of conceptually similar functions that provide services to the layer above it and receives services from the layer below it. These functions are specified according to protocols that define each layer.

Layer 1 of the OSI model is the physical layer. The physical layer is the first layer and defines the manner for transmitting raw bits over a physical link connecting nodes in a network. Examples of layer 1 protocols include IEEE 802.3, IEEE 802.11, and so on.

Layer 2 of the OSI model is the Data Link Layer. The Data Link Layer delivers frames between devices on the same Local Area Network (LAN). Examples of layer 2 protocols include the Point-to-Point Protocol (PPP), Asynchronous Transfer Mode (ATM) protocol, Frame Relay, Serial Line Internet Protocol (SLIP), and so on. The Data Link Layer may also be referred to as the Media Access Control (MAC) layer.

Layer 3 of the OSI model is the network layer. The network layer provides the functionality to route packets across intermediate devices between networks. Layer 3 provides for delivery of packets between a source and destination via one or more networks. Examples of layer 3 protocols include the Internet Protocol (IP), Internet Protocol Security (IPsec), and so on.

Layers 4 through 7 include the transport layer (4), the session layer (5), the presentation layer (6), and the application layer (7). For purposes of this discussion, packet filter hooks are discussed in relation to the Internet Protocol that operates at layer 3 in the 7-layer OSI model. However, packet filter hooks may be implemented in the Internet Protocol as it occurs in network communication models other than the 7-layer OSI model. Other network communication models may define the Internet Protocol as operating in a different layer. In these communication models, packet filter hooks operate in the same layer as the Internet Protocol.

Method 100 includes, at 110, selectively passing a network packet from an Internet Protocol kernel module to a filter in response to determining that at least one filter hook is registered in the filter. In one embodiment, the Internet Protocol kernel module and the filter are modules in a system kernel of a computing system. In one example, the system kernel is part of the Solaris operating system but other operating systems can be used.

In one embodiment, when the network packet is passed at 110 from the Internet Protocol kernel module to the filter, a function is called and the network packet is passed as a data structure to the function. In another embodiment, when the network packet is passed, the method generates an electrical signal and transmits the electrical signal between two devices. For example, the network packet may be passed between a router and a second device that is a dedicated firewall or packet sniffing device. The dedicated firewall or packet sniffing device may be connected to the router via a network connection, a direct bus link, and so on.

In one embodiment, the method determines that at least one filter hook is registered in the filter as a function call in a stack of functions for performing layer 3 processing of the network packet. In other embodiments, the method can determine that at least one filter hook is registered by reading a register to check if a flag is set, by detecting a packet filter hook in a stack, and so on. The determining occurs at predetermined filter hook points in the stack of functions. Each predetermined filter hook point is associated with a different type of filter hook.

At 120, the filter selectively re-directs the network packet to a packet sniffer upon determining that the packet is a member of a class of packets specified by the registered filter hook. In one embodiment, the packet sniffer is a module in a system kernel of the computer system. In an alternative embodiment, the packet sniffer may be a separate hardware device and so on.

The filter hook may be, for example, a rule that specifies the class of packets by denoting a specific attribute to qualify as a member of the class. In another embodiment, the filter hook specifies that the class of packets includes all possible packets and thus operates as a simple forwarding mechanism. The filter hook may also include, for example, a logical expression that defines the class of packets, a subroutine with multiple logical expressions for defining the class of packets, and so on.

Figure 2:
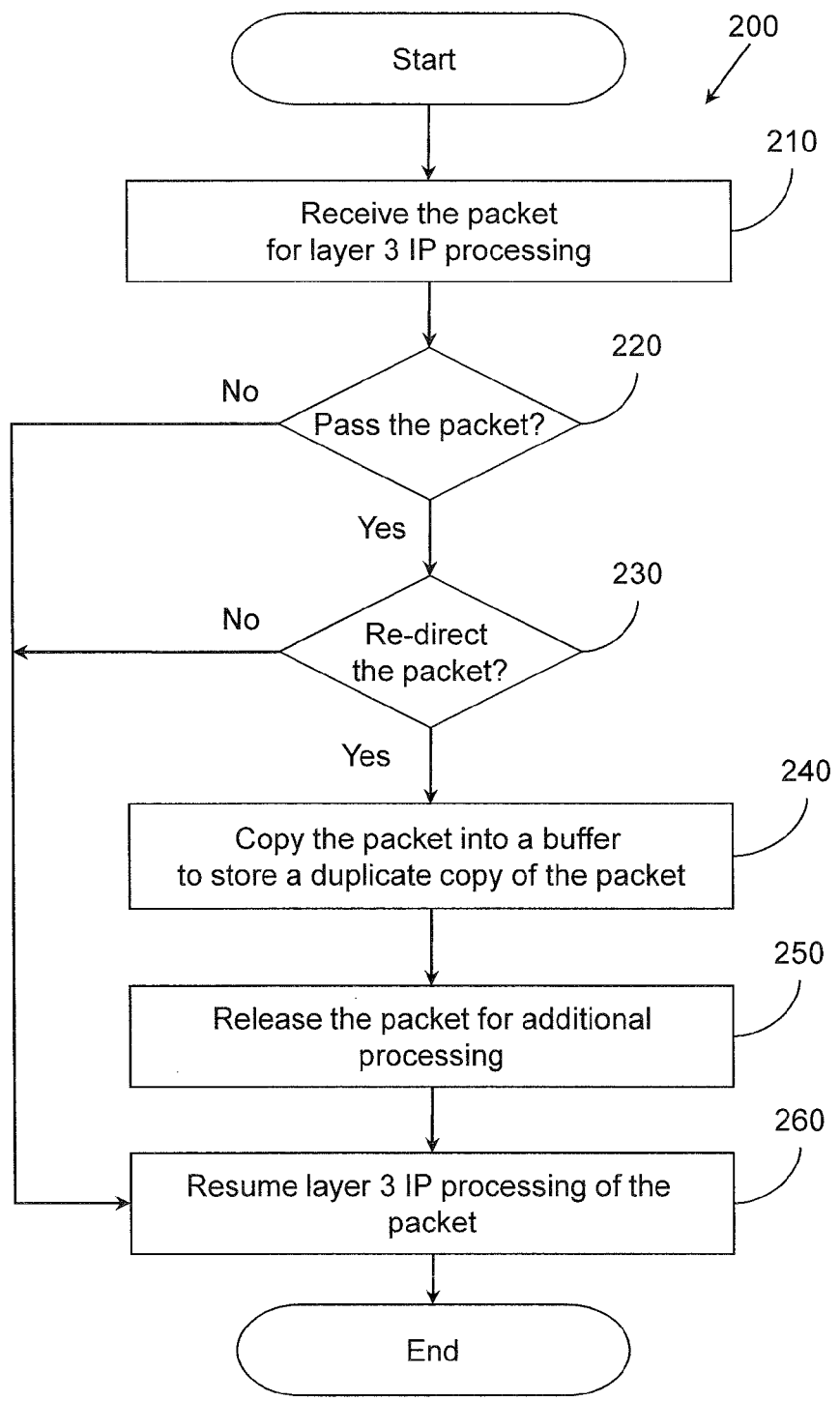
FIG. 2 illustrates another embodiment of a method associated with packet sniffing using packet filtering hooks.

FIG. 2 illustrates one embodiment of a method 200 associated with a packet sniffer that uses packet filter hooks to capture network packets.

At 210, the network packet is received in an Internet Protocol kernel module to perform layer 3 Internet Protocol processing of the network packet in a protocol stack. In one embodiment, receiving the network packet in the Internet Protocol kernel module includes receiving an inbound network packet from a layer 2 processing service. In an alternative embodiment, receiving the network packet includes receiving an outbound network packet from a layer 4 processing service, a firewall/NAT function, and so on.

At 220, the method 200 determines whether at least one filter hook is registered in the filter. If a filter hook is registered, then the network packet is selectively passed from the Internet Protocol kernel module to a filter. In one embodiment, the filter is a set of filter hooks that correspond to a type of filter hook associated with the current point in the layer 3 processing stack. In an alternate embodiment, the filter is a kernel module that includes the set of filter hooks. At 220, if no filter hooks are registered in the filter for the filter hook point, then the method 200 continues to block 260 where layer 3 processing of the packet resumes.

If at 220 a filter hook is registered and the packet is to be passed, then the method continues to 230 where the network packet is redirected to a packet sniffer on determining that the packet is a member of a class specified by a filter hook. In one embodiment, selectively re-directing the network packet to the packet sniffer occurs without configuring a Network Interface Card (NIC) to use a promiscuous mode and during layer 3 Internet Protocol processing of the network packet. Placing the NIC in a promiscuous mode automatically directs all network packets to the packet sniffer. By not placing the NIC in a promiscuous mode and capturing packets during layer 3 processing, the packet sniffer is configured to more selectively capture packets. This occurs, for example, by specifying a class of packets to be captured using the filter hook.

The network packet being re-directed to the packet sniffer may also include passing the network packet to the packet sniffer as a data structure in a function call, providing a memory location to the packet sniffer, and so on. Determining the network packet is a member of a class specified by a filter hook may include applying a rule specified by the filter hook, and so on. The rule may denote certain attributes of the packet that must be met to be a member of the class of packets.

At 230, if the packet is not a member of the class of packets specified by the filter hook, then the filter checks for additional filter hooks in the set of filter hooks. The filter will apply any additional filter hooks to the network packet. If no additional filter hooks are registered, the filter then passes the network packet to the Internet Protocol kernel module to resume processing.

At 240, the packet sniffer copies the network packet into a buffer to store a duplicate copy of the network packet. Copying the network packet into the buffer may include copying the whole network packet, copying only the header of the network packet, copying only a portion of a header of the network packet, copying pieces of the packet specified by the packet sniffer, and so on. The packet sniffer may be configured to copy only the data necessary to perform analysis on the network packet. The buffer may be, for example, a database, a log file, a data storage device and so on.

The packet sniffer may be, for example, the PF_Packet packet sniffer, the STREAMS packet sniffer, or a Berkeley Software Distribution (BSD) Packet Filter (BPF) packet sniffer. The packet sniffer is configured to receive the network packet during layer 3 Internet Protocol processing of the network packet. The packet sniffer may be embodied as part of a system kernel, as an individual module separate from the system kernel, and so on.

At 250, the network packet is released for additional processing. Releasing the network packet for additional processing may include the packet sniffer sending the network packet to the filter. In an alternative method, the releasing may include sending the network packet to the Internet Protocol kernel module. As explained with step 230, in one embodiment, the filter will apply any additional filter hooks that registered for the filter hook point to the network packet. If no additional filter hooks are registered the filter will pass the network packet to the Internet Protocol kernel module to resume processing. Applying additional packet filter hooks may include applying a firewall, NAT, and/or packet sniffing filter hook to the network packet.

At 260, the filter selectively provides the network packet to the Internet Protocol kernel module to resume processing upon determining there are no additional filter hooks. In one embodiment, the filter checks a flag to determine if additional filter hooks are set and perform additional processing based on any additional filter hooks before sending the network packet to the Internet Protocol kernel module. The filter may be configured to send the network packet to the Internet Protocol kernel module only after all filter hooks are applied for a particular filter hook point in the processing stack.

Figure 3:
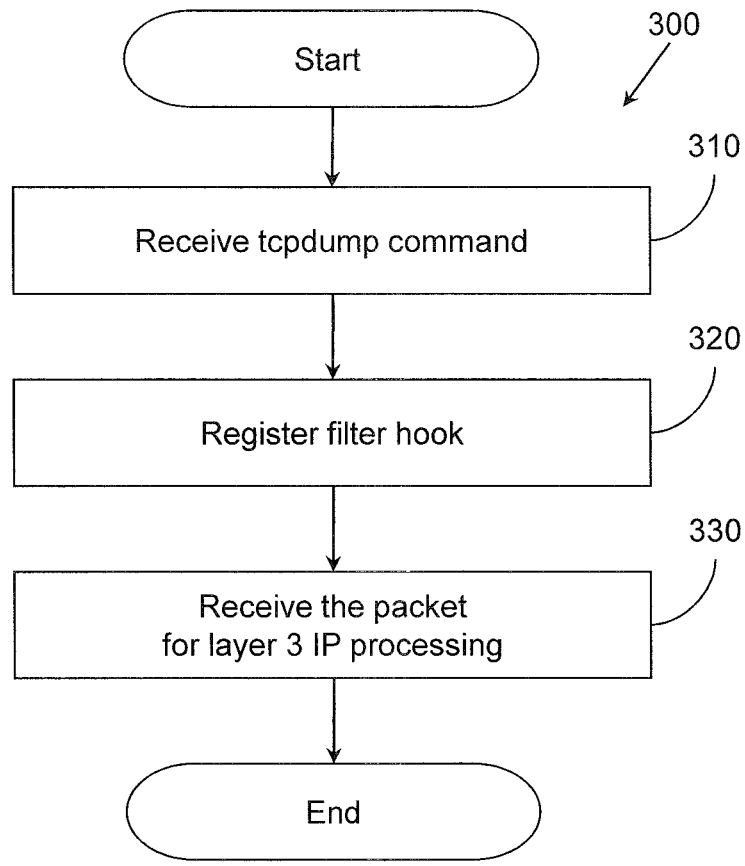
FIG. 3 illustrates one embodiment of a method associated with registering a packet filter hook for packet sniffing.

FIG. 3 illustrates one embodiment of a method 300 associated with registering filter hooks in a computer system. At 310, the computer system receives an input from a user command that specifies the filter hook. In one embodiment, the user command is a tcpdump user command, which is a command line interface function in the Solaris operating system. The tcpdump user command specifies the filter hook by receiving input from a command line interface according to a syntax. The syntax includes a filter hook type and additional conditions as follows:

[<name>=]<family>: <hookname>[/<hint>[:<hintdata>]] [logical argument]

name—The "name" attribute is the name of an existing network interface that is recognized by the Internet Protocol kernel module. If "name" is not specified or the option "-i" is used then all packets in the system are applied to that filter hook regardless of the network interface on which the system receives or sends the packets.

family—The "family" attribute specifies one of "inet" for Internet Protocol version 4 packets only, "inet6" for Internet Protocol version 6 packets only, or "ip" for all Internet Protocol versions. This attribute limits the filter hook to packets that are formatted according to the protocol version of the attribute.

hookname—The "hookname" attribute is the name of one of the packet filter hooks. The packet filter hooks are PHYSICAL_IN, PHYSICAL_OUT, LOOPBACK_IN, LOOPBACK_OUT, and FORWARDING.

hint—The "hint" attribute specifies the relative placement among other filter hooks at the same filter hook point. The hint may be, for example, "first", "last", "before", or "after". The "hint" allows the tcpdump command to specify where in a set of filter hooks a filter hook being registered is to be placed.

hint-data—The "hint-data" attribute is for use with "before" and "after" from the hint attribute. The hint-data allows a filter hook being registered to be placed directly before or after a filter hook specified by the hint-data.

logical argument—The "logical argument" attribute is where logical operators are specified to define conditions for further filtering packets. The logical argument may be used to specify a class of packets for a packet filter hook that is being registered.

With continued reference to FIG. 3, at 320, the method includes registering the filter hook. The filter hook may be registered by placing a function callback of the filter hook in the filter. In another embodiment, the filter hook may be registered by setting a flag that denotes that at least one filter hook is registered for a filter hook point associated with the filter hook. The filter hooks are selected from a variety of different types of hooks, for example, a PHYSICAL_IN hook, a PHYSICAL_OUT hook, a FORWARDING hook, a LOOPBACK_IN hook, and a LOOPBACK_OUT hook. Each filter hook is associated with a specific filter hook point in a layer 3 processing stack. In an alternative embodiment, when the filter hook is registered, the method may include providing conditions specified by the filter hook to the filter. In this instance, the filter logs the conditions and applies them to packets it receives.

Example descriptions of the various filter hooks are as follows. The PHYSICAL_IN hook provides for selectively re-directing an inbound network packet during processing of the inbound network packet by the Internet Protocol kernel module. To perform the selective re-directing in this way when a PHYSICAL_IN hook is registered it is linked to an associated filter hook point in the layer 3 processing stack. In one embodiment, the associated filter hook point is located in the layer 3 processing stack at a point that allows the PHYSICAL_IN hook to capture an inbound packet during processing of the inbound packet by the Internet Protocol kernel module. In one embodiment, this filter hook point is located in the layer 3 processing stack after a function that checks to verify that the packet length matches an associated in-buffer length and before verification of the network packet's checksum. In one example, the filter hook point for a PHYSICAL_IN hook is a function call in the layer 3 processing stack. When a PHYSICAL_IN hook is registered the function call is activated. When the function call is reached during processing of an inbound packet the function call then calls a filtering function that includes the PHYSICAL_IN hook.

In one embodiment, the layer 3 processing stack for an inbound packet includes performing functions in the following order: (1) Carrier Grade Transport Protocol (CGTP) processing, (2) DHCP packet inspection, (3) In-buffer length verification, (4) Loopback check, (5) PHYSICAL_IN hook function check, (6) Packet checksum verification, (7) local or remote destination delivery check, and so on. Of course, in other embodiments, the order of these functions may be altered. For example, the PHYSICAL_IN hook function check may occur between (2) and (3), (6) and (7), and so on. Additionally, the order of the other functions may also vary.

The PHYSICAL_OUT hook provides for selectively re-directing the network packet before the Internet Protocol kernel module performs outbound packet processing of the network packet. The PHYSICAL_OUT hook operates in a similar manner as the PHYSICAL_IN hook. When the PHYSICAL_OUT hook is registered it is linked to an associated filter hook point in the layer 3 processing stack. The filter hook point for the PHYSICAL_OUT hook is located at a different point in the layer 3 processing stack than the filter hook point for the PHSYICAL_IN hook. The filter hook point for the PHYSICAL_OUT hook is located in the layer 3 processing stack at a point that allows for the capture of outbound packets during processing by the Internet Protocol kernel module.

In one embodiment, the layer 3 processing stack for an outbound packet includes performing functions in the following order: (1) Check which NIC is to send the network packet, (2) Fragment the packet according to system rules, (3) PHYSICAL_OUT hook function check, (4) Attach link layer header, and so on. Of course, in other embodiments, the order of these functions may be altered. For example, the PHYSICAL_OUT hook function check may occur between (1) and (2), and so on. Additionally, the order of the other functions may also vary.

The FORWARDING hook provides for selectively re-directing a network packet being forwarded through the computer to a destination computer. The FORWARDING hook operates in a similar manner as the PHYSICAL_OUT and PHYSICAL_IN hook. The FORWARDING hook is associated with a filter hook point that is located in the processing stack at a point that allows for the capture of packets that are to be forwarded by the computer system. In this way, the FORWARDING hook can capture request and reply packets sent between two endpoint devices.

In one embodiment, the layer 3 processing stack for a packet that being forwarded includes performing functions in the following order: (1) Verify NIC is set to route packets, (2) Address lookup for NIC, (3) FORWARDING hook function check, (4) Packet integrity check, and so on. Of course, in other embodiments, the order of these functions may be altered. For example, the FORWARDING hook function check may occur between (1) and (2), and so on. Additionally, the order of the other functions may also vary.

The LOOPBACK_IN hook provides for selectively re-directing the network packet on a logical interface during processing by the Internet Protocol kernel module for inbound packets. The LOOPBACK_OUT hook provides for selectively re-directing the network packet on a logical interface during processing by the Internet Protocol kernel module for outbound packets. These hooks operate in a similar manner as the PHYSICAL_IN hook and the PHYSICAL_OUT hook except they operate on logical interfaces for local packet delivery instead of actual network interfaces.

With reference again to FIG. 3, at 330, after the filter hook is registered, packets received for layer 3 processing in the computer system may then be filtered according to the filter hook as specified, for example, in method 200.

In one embodiment, example uses of the tcpdump user command and associated syntax is as follows:

Example 1 tcpdump -i net6:PHYSICAL_OUT/before:ipfilter

This example command provides for registering a packet filter hook that captures all Internet Protocol version 6 packets that are being sent out of the computer system. The packet filter hook captures the packets directly before they are sent to the ipfilter firewall/NAT packet filter hook. The packet filter hook captures the specified class of packets during layer 3 processing.

Example 2 tcpdump -i ip:PHYSICAL_IN,
ip:PHYSICAL_OUT

This example registers two packet filter hooks for packet sniffing that capture Internet Protocol version 4 and version 6 packets. These example packet filter hooks use the "-i" option to capture packets on all interfaces in the system. The PHYSICAL_IN hook is for capturing inbound packets and the PHYSICAL_OUT hook is for capturing outbound packets.

Example 3 tcpdump -i net:FORWARDING

This example registers a packet filter hook for packet sniffing that captures all Internet Protocol version 4 packets that are being forwarded through the computer system on any interface.

Example 4 tcpdump -nvei inet:PHYSICAL_IN/first,
inet:PHYSICAL_IN/last port 25 or port 2500

In this example, the tcpdump user command specifies two separate packet filter hooks. The packet filter hooks specified here capture the packet twice at the same packet filter hook point. For example, if an IPfilter function is configured in a computer system where this command is received a packet will be captured before and after being processed by the IPfilter function. Specifying that one packet filter hook is to occur "first" and the other is to be "last" provides for other packet filter hooks to operate on packets between these two packet filter hooks. This command is an example of how the packet filter hooks may be used to diagnose processing errors in a function such as IPfilter that also uses packet filter hooks.

This example also specifies a logical argument, "port 25 or port 2500". This logical argument defines a class of packets that specify either port 25 or port 2500. Thus, the packet filter hooks from this command will only re-direct packets to the packet sniffer that satisfy the port 25 or port 2500 requirement. If the IPfilter function is set to translate inbound packets sent to port 25 to port 2500 then the packet filter hooks will capture a packet sent to port 25 before it reaches the IPfilter and after the IPfilter when it has been translated to port 2500.

In one embodiment, an example output from a packet captured using this example command is as follows:

Output for a packet from the "first" packet filter hook before IPfilter:
21:55:06.472705 PhysicalIn bge0, -2>-2, family IPv4 (2), length 96: (tos 0x0, ttl 57, id 60360, offset 0, flags [DF], proto TCP (6), length 64)
10.132.148.70.39924>10.5.233.119.25: Flags [S], cksum 0xd7cd (correct), seq 746969011, win 64240, options [mss 1460,nop,nop,TS val 218899368 ecr 0,nop,wscale 1,nop, nop,sackOK], length 0
Output for the packet from the "last" packet filter hook after IPfilter:
21:55:06.472842 PhysicalIn bge0, -2>-2, family IPv4 (2), length 96: (tos 0x0, ttl 57, id 60360, offset 0, flags [DF], proto TCP (6), length 64)
10.132.148.70.39924>127.0.0.1.2500: Flags [S], cksum 0x429e (correct), seq 746969011, win 64240, options [mss 1460,nop,nop,TS val 218899368 ecr 0,nop,wscale 1,nop, nop,sackOK], length 0

Comparing the data from before and after the IPfilter function shows that the IPfilter function has performed NAT processing on the packet to change the destination address. The differences in the packet from before and after processing by the IPfilter are underlined.

Example 5 tcpdump -nei inet:FORWARDING

Example 5 is one example of how a packet filter hook may be used in a router. This example registers a packet filter hook that captures both an inbound request packet and an outbound reply packet that are being forwarded by the router.

The following is an example output from the packet sniffer using this packet filter hook.

Example request packet:
09:53:26.923765 Forwarding e1000g1→igb0, -2>-2, family IPv4 (2), length 116: 10.100.47.47>10.100.48.48: ICMP echo request, id 41969, seq 3621, length 64

Example reply packet:
09:53:26.923802 Forwarding igb0→e1000g1, -2>-2, family IPv4 (2), length 116: 10.100.48.48>10.100.47.47: ICMP echo reply, id 41969, seq 3621, length 64

The output from example 5 shows a log entry for a request packet sent from a device at address 10.100.47.47 to a device at address 10.100.48.48 and a log entry for a reply packet from 10.100.48.48 sent to 10.100.47.47. Use of the tcpdump command with the FORWARDING hook captures both of these packets as they pass through the computer system and may correlate their entries in a log for ease of comparison.

Figure 4:
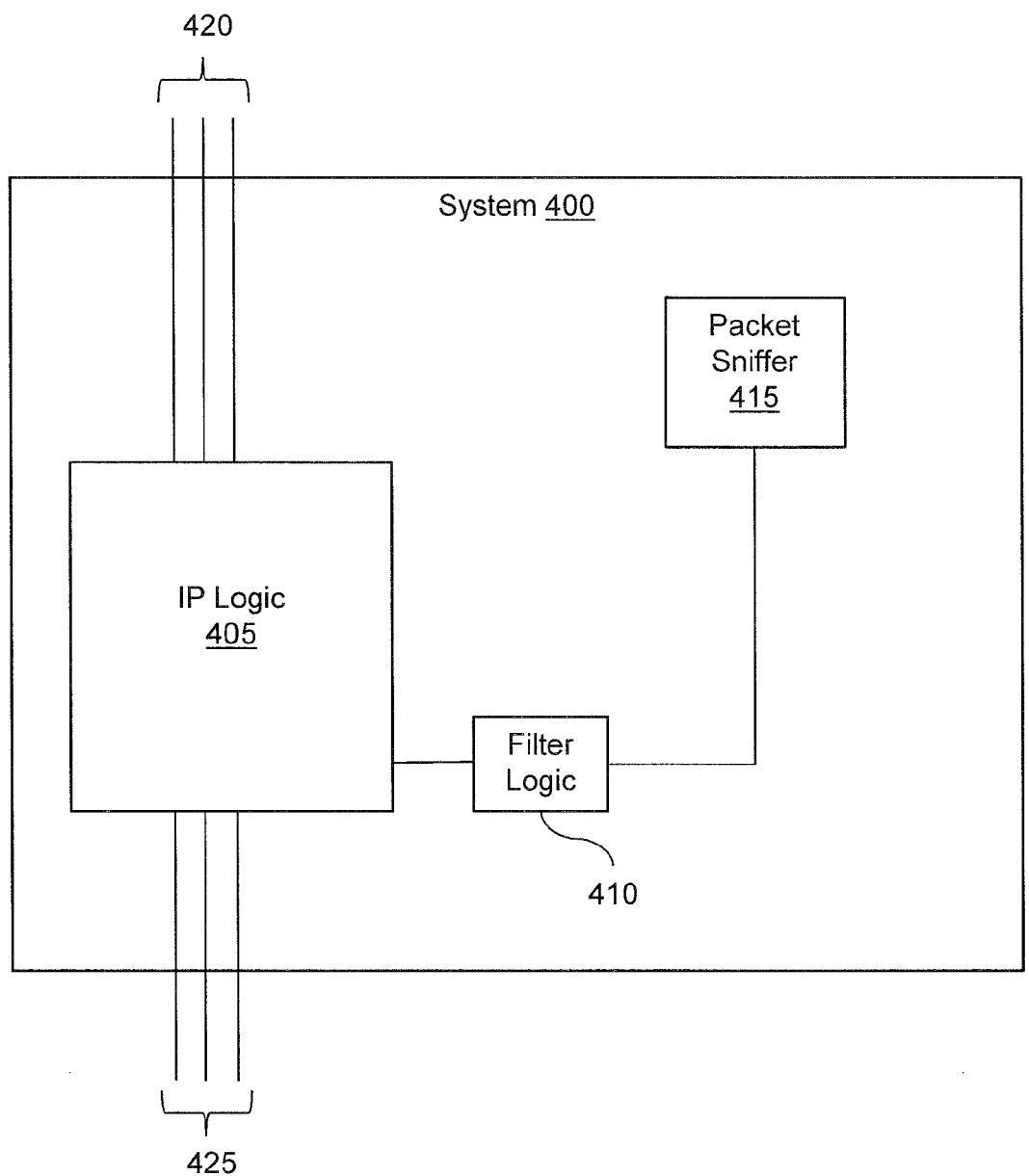
FIG. 4 illustrates an embodiment of a system associated with packet sniffing using packet filter hooks.

FIG. 4 illustrates one embodiment of a system 400 involved with packet sniffing using filter hooks. System 400 includes IP logic 405. In one embodiment, the IP logic 405 processes a packet according to a layer 3 Internet Protocol of a protocol stack. The IP logic 405 processes both inbound and outbound packets in system 400. The IP logic 405 receives outbound packets on I/O paths 420. The outbound packets are packets received from higher layers in the protocol stack. One example of a higher layer in the protocol stack that may send outbound packets to the IP logic 405 is the transport layer. The IP logic 405 receives inbound packets on I/O paths 425. The inbound packets are packets received from lower layers in the protocol stack. One example of a lower layer in the protocol stack that may send inbound packets to the IP logic 405 is the MAC layer.

The IP logic 405 may also forward the packet to filter logic 410. The IP logic 405 forwards the packet to the filter logic 410 if it determines that at least one filter hook is registered in the filter logic 410. The IP logic 405 determines whether to forward the packet at predetermined hook points during layer 3 Internet Protocol processing of the packet. For example, at a predetermined hook point, the IP logic checks a flag to determine whether any filter hooks associated with the predetermined hook point are registered in the filter logic 410. If the flag is set, then the IP logic 405 forwards the packet to the filter logic 410.

The filter logic 410 receives packets from the IP logic 405 and selectively sends the packets to a packet sniffer 415 based, at least in part, on a filter hook that is found in a set of filter hooks. The set of filter hooks are associated with an individual predetermined filter hook point. The set of filter hooks may include a plurality of filter hooks of different types. One or more of the plurality of filter hooks may be a packet sniffing filter hook. The plurality of filter hooks may also include filter hooks for a firewall function, a NAT function, or other network function. The filter logic 410 differentiates between packet sniffing hooks, firewall hooks, NAT hooks, and other network function hooks when applying the hooks to a packet. In this way, the filter logic 410 determines where to send a packet based on the type of hook.

Figure 5:
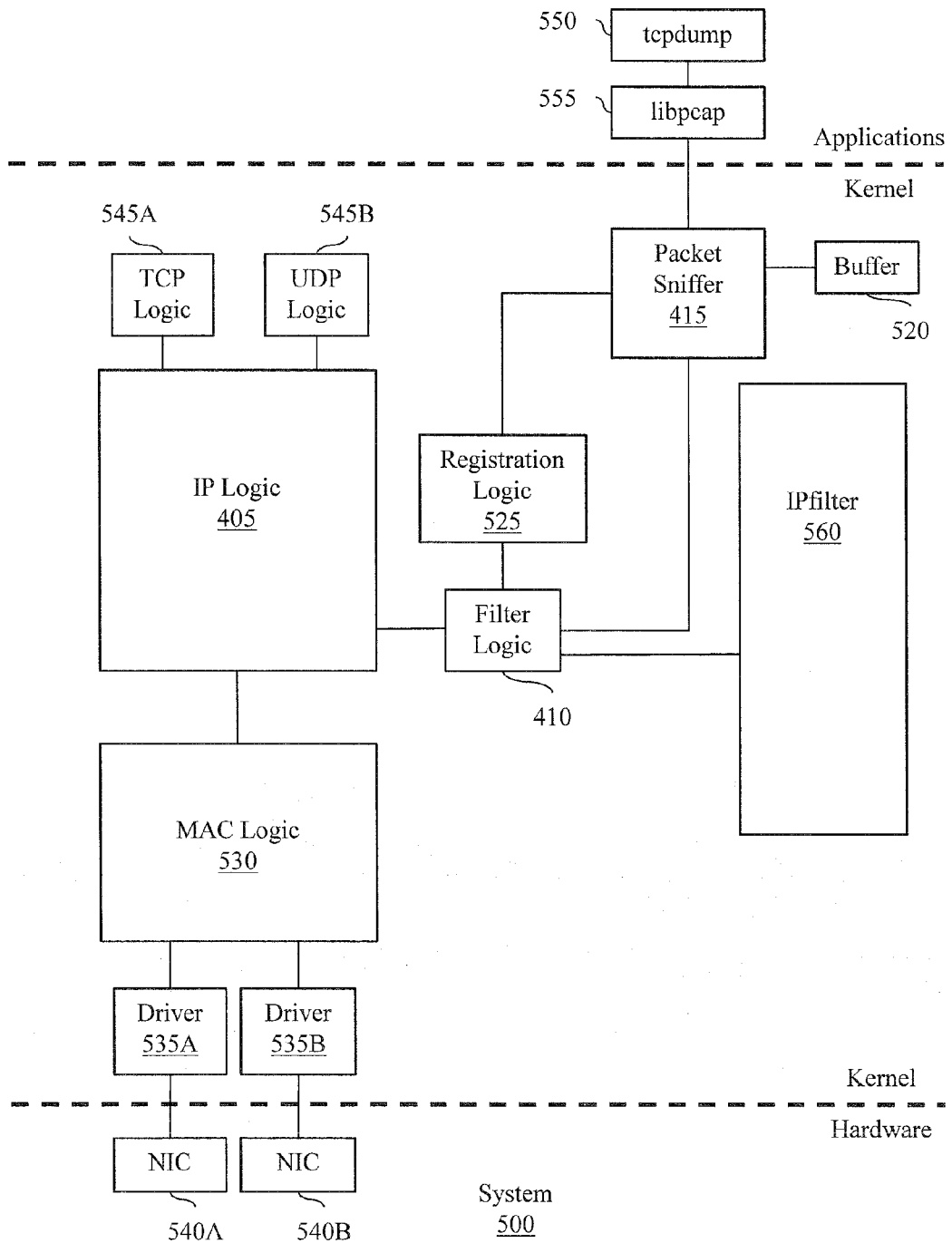
FIG. 5 illustrates another embodiment of a system associated with packet sniffing using packet filter hooks.

FIG. 5 illustrates one embodiment of a system 500 that uses filter hooks to capture packets for packet sniffing. FIG. 5 illustrates an embodiment where tcpdump 550 and libpcap 555 are embodied as application layer services. In one embodiment, the libpcap 555 is a library of functions that provide access to a packet capture Application Program Interface (API). FIG. 5 further illustrates a system kernel configuration. Elements of the system kernel are illustrated between the two dashed lines. These boxes and their connecting lines are illustrative of functions, subroutines, and other elements that perform the stated functions. Elements 540A and 540B are hardware layer elements involved in system 500.

System 500 includes an IP logic 405 that is similar to IP logic 405 in system 400. System 500 also includes filter logic 410 and packet sniffer 415 that are similar to the logics 410 and 415 of system 400. The IP logic 405 determines whether at least one filter hook is registered at a set of hook points during the processing of the packet. Each hook point in the set of hook points corresponds to a set of filter hooks. The IP logic 405 is configured to forward the packet to the filter logic 410 if the set of filter hooks associated with a hook point is not empty. For example, the IP logic 405 determines whether the set of filter hooks is empty based on checking a null flag for the set of filter hooks, a register value, and so on. Each hook point in the set of hook points corresponds to a type of filter hook. For example, the types of filter hooks may include PHYSICAL_IN, PHYSICAL_OUT, LOOPBACK_IN, LOOPBACK_OUT, and FORWARDING.

In system 500, MAC logic 530 operably connects to IP logic 405. IP logic 405 receives inbound packets from the MAC logic 530 and provides outbound packets to the MAC logic 530. The MAC logic 530 performs layer 2 processing of the packets. The MAC logic 530 receives inbound packets from and provides outbound packets to Drivers 535A and 535B. Network Interface Card (NIC) 540A and NIC 540B in combination with Drivers 535A and 535B perform layer 1 processing of inbound and outbound packets.

System 500 further includes TCP logic 545A for performing layer 4 processing of inbound and outbound TCP packets. UDP logic 545B performs layer 4 processing of inbound and outbound UDP packets.

Filter logic 410 operably connects to IP logic 405, packet sniffer 415, and IPfilter 560. Filter logic 410 selectively sends the packet to the packet sniffer 415 based on a filter hook. The filter logic 410 sends the packet to the packet sniffer 415 if the packet is a member of a class of packets specified by the filter hook. The filter logic 410 releases the packet to the IP logic 405 for additional processing if the packet is not a member of the class specified by the filter hook. In an alternate embodiment, a second filter hook may be present in the filter logic for a hook point and thus the filter logic 410 applies the second filter hook before releasing the packet to the IP logic 405. Applying the second filter hook may include sending the packet to an IPfilter 560 instead of the packet sniffer 415. Alternatively, applying the second filter hook may include, for example, sending the packet to the packet sniffer 415 again if it is a member of a class of packets specified by the second filter hook.

The packet sniffer 415 receives the packet from the filter logic 410 if the filter hook is a packet sniffing filter hook. If the filter hook is an IPfilter-type filter hook, the filter logic provides the packet to the IPfilter 560.

In one embodiment, IPfilter 560 is a Network Address Translation (NAT) and firewall module. IPfilter 560 receives packets through filter hooks similar to those used for packet sniffing. IPfilter 560 performs NAT and/or firewall processing of the packets it receives. IPfilter 560 provides processed packets back to the IP logic 405 via filter logic 410.

System 500 also includes a packet sniffer 415. In one embodiment, packet sniffer 415 is configured to filter the packet according to an attribute of the packet. Filtering performed by the packet sniffer 415 on packets received from the filter logic 410 may occur to organize the packets according to a type or other feature of the packets. The packet sniffer 415 stores a duplicate copy of the packet by copying the packet into a buffer 520. Packet sniffer 415 sends the packet to the filter logic 410 for additional processing after copying the packet into the buffer 520. The packet sniffer 415 performs packet sniffing on the duplicate copy of the packet. The packet sniffing performed by packet sniffer 415 is a passive operation that does not modify the packet. In an alternate embodiment, packet sniffer 415 may alter the packet if it determines that the packet is flawed. In one embodiment, packet sniffer 415 is a Berkeley packet filter (BPF) packet sniffer that is configured to receive packets during layer 3 Internet Protocol processing of the packets.

System 500 includes registration logic 525. Registration logic 525 operably connects to filter logic 410 and packet sniffer 415. In one embodiment, the registration logic 525 is a netinfo module in the Solaris operating system kernel. Registration logic 525 provides for registering the filter hook by creating a function callback to the filter hook in filter logic 410. Registering the filter hook places the filter hook in a set of filter hooks associated with a predetermined hook point. In one embodiment, the set of filter hooks are function callbacks and are stored in the filter logic 410.

Creating a callback is based, at least in part, on a tcpdump command from a tcpdump application layer service 550. The tcpdump application layer service 550 provides a command line interface functionality. The tcpdump application layer service uses a libpcap 555 to register a filter hook. In one embodiment, the libpcap 555 is a library of functions that provide access to a packet capture Application Program Interface (API). In an alternate embodiment, the libpcap 555 may be, for example, a Winpcap library API. Using the libpcap 555 tcpdump 550 access an I/O control. The I/O control may be, for example, a BIOCSHOOK I/O control. The tcpdump 550 uses the libpcap 555 to access the BIOCSHOOK I/O control. Accessing the BIOCSHOOK I/O control the tcpdump 550 directs the packet sniffer 415, registration logic 525, and filter logic 410 to register the filter hook.

The predetermined hook point is selected based, at least in part, on a type of the filter hook. The type of the filter hook is selected from a PHYSICAL_IN hook, a PHYSICAL_OUT hook, a FORWARDING hook, a LOOPBACK_IN hook, and a LOOPBACK_OUT hook.

Figure 6:
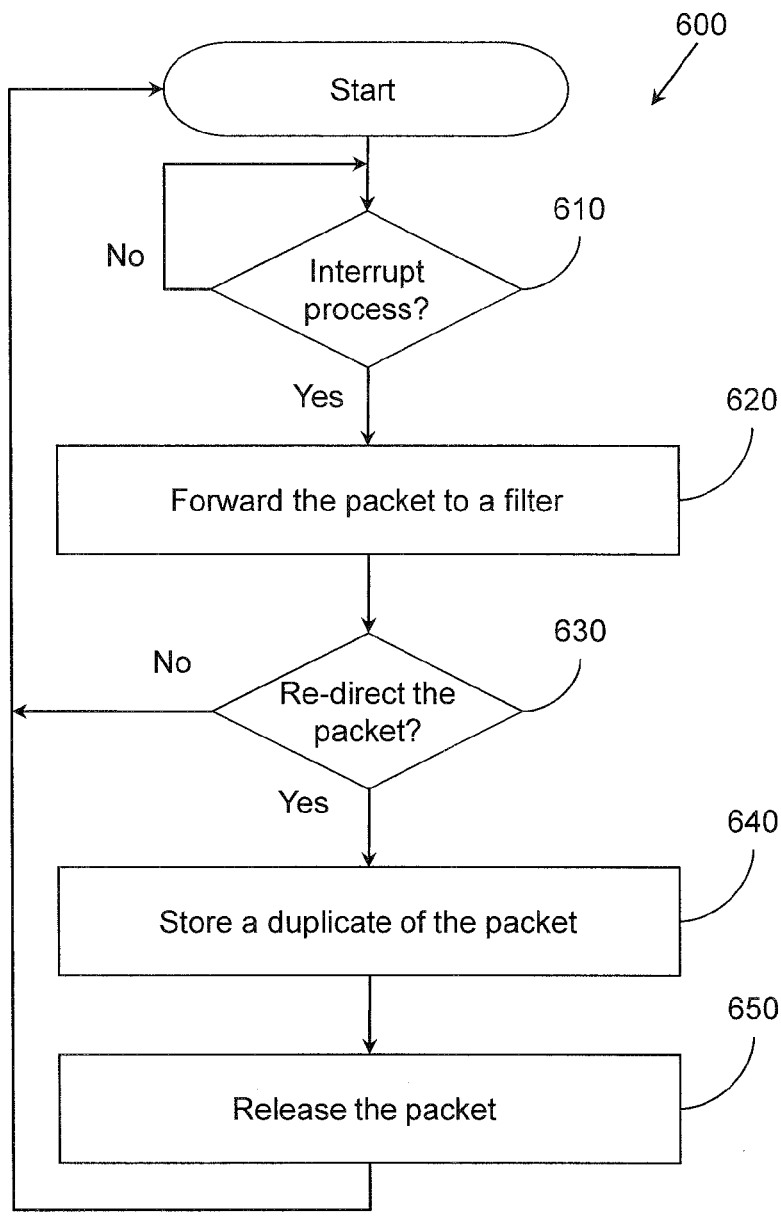
FIG. 6 illustrates one embodiment of a method associated with emulating packet sniffing using packet filtering hooks.

FIG. 6 illustrates one embodiment of a method 600 associated with emulating packet sniffing using filter hooks in a computer system.

At 610, the method includes interrupting a layer 3 processing service at a filter hook point in a processing stack while processing a packet if at least one packet filter hook is registered for the filter hook point. In one embodiment, the method operates as a background process and monitors the layer 3 processing service. In this embodiment, the interrupting functionality is aware of whether a packet filter hook is registered. Monitoring the layer 3 processing allows the method to interrupt the service at the filter hook point if a filter hook is registered. The filter hook point may be one of several filter hook points in a layer 3 processing stack. Each filter hook point in the processing stack corresponds to a different type of packet filter hook.

At 620, the method includes forwarding the packet to a filter in response to interrupting the layer 3 processing service. The filter includes a function callback for each of the at least one packet filter hooks that are registered. On receiving the packet, the filter provides the packet to each function callback in the order in which they are arranged in the filter.

At 630, the method includes re-directing the packet to a packet sniffer if the packet is a member of a class of packets specified by the at least one packet filter hook. To determine if the packet is a member of the class, the filter provides the packet to the function callback for the packet filter hook. The function callback provides the packet to a subroutine that determines if the packet satisfies one or more conditions to be a member of the class. If the packet is a member of the class, then the subroutine re-directs the packet to the packet sniffer. If the packet is not a member of the class, the filter may apply additional filters or send the packet to the layer 3 processing service to continue processing.

At 640, the method includes storing a duplicate of the packet in the packet sniffer for packet sniffing. Storing a duplicate of the packet may include, for example, storing a copy in a data store, storing a copy in a buffer, storing a copy in a memory, storing a copy in a database, and so on.

At 650, the method includes releasing the packet from the packet sniffer. In one embodiment, releasing the packet from the packet sniffer includes sending the packet back to the layer 3 processing service. In an alternative embodiment, releasing the packet may include, for example, sending the packet to the filter, sending the packet to a firewall function or NAT function, sending the packet to a queue, and so on. In an alternate embodiment, storing a duplicate may include storing only a portion of the packet.

After 650, the method 600 may restart by monitoring for the layer 3 process to reach a different filter hook point.

In one or more embodiments, the methods or functions described herein and/or their equivalents can be performed by computer-executable instructions that are stored in a non-transitory computer-readable medium such that when the instructions are executed cause a computer to perform the associated method.

Figure 7:
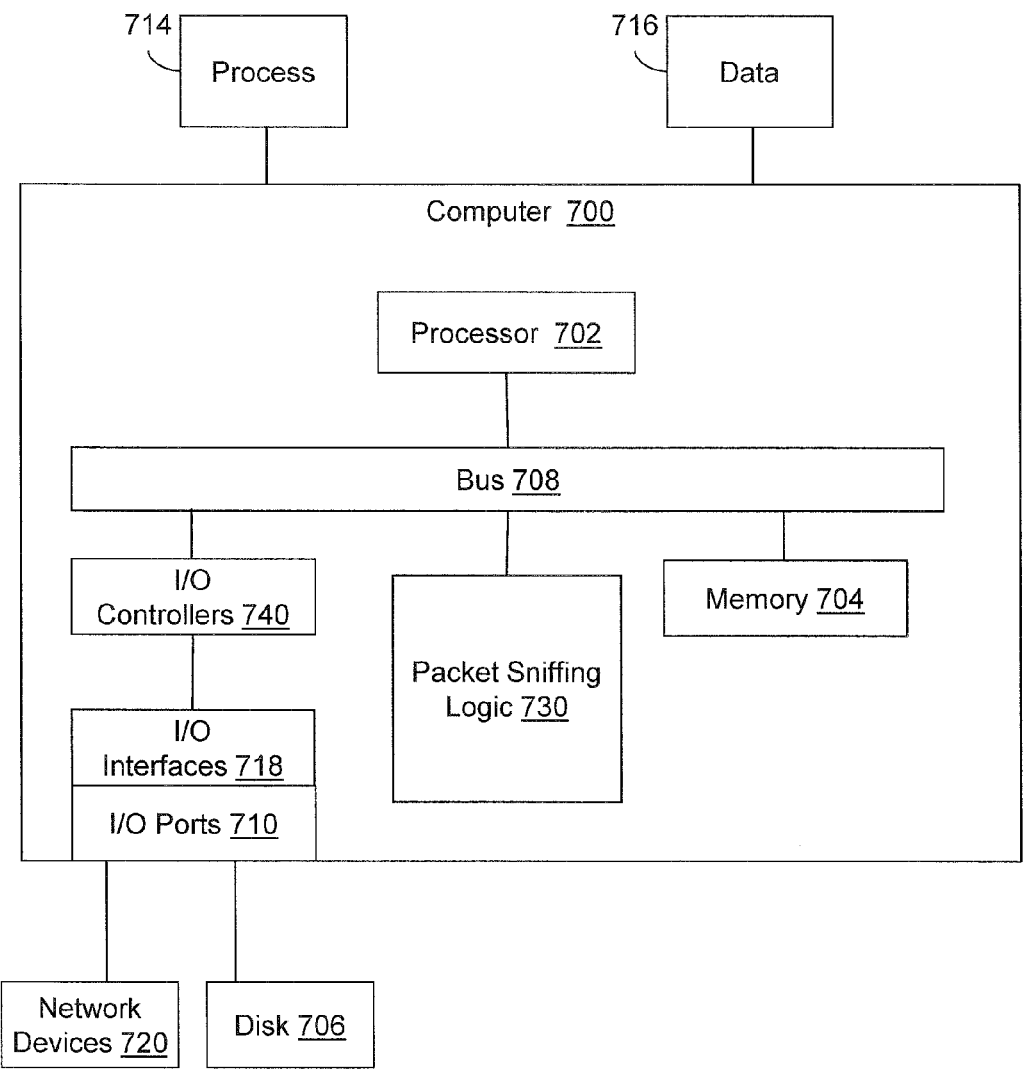
FIG. 7 illustrates another embodiment of a system associated with an embodiment of a computing system in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 includes a packet sniffing logic 730 configured to facilitate capturing packets for packet sniffing using filter hooks in a layer 3 packet processing service. In different examples, the logic 730 may be implemented in hardware, a non-transitory computer-readable medium with stored instructions, firmware, and/or combinations thereof. While the packet sniffing logic 730 is illustrated as a hardware component attached to the bus 708, it is to be appreciated that in one example, the packet sniffing logic 730 could be implemented in the processor 702.

In one embodiment, packet sniffing logic 730 is a means (e.g., hardware, non-transitory computer-readable medium, firmware) for capturing packets being processed in computer 700 and performing packet sniffing functions on those packets.

The means may be implemented, for example, as an ASIC programmed to packet sniff using packet filter hooks. The means may also be implemented as stored computer executable instructions that are presented to computer 700 as data 716 that are temporarily stored in memory 704 and then executed by processor 702.

Logic 730 may also provide means (e.g., hardware, non-transitory computer-readable medium that stores executable instructions, firmware) for performing packet sniffing using packet filter hooks.

Generally describing an example configuration of the computer 700, the processor 702 may be a variety of various processors including dual microprocessor and other multiprocessor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the I/O interfaces 718, and/or the I/O ports 710. Through the network devices 720, the computer 700 may interact with a network. Through the network, the computer 700 may be logically connected to remote computers. Networks with which the computer 700 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer cause the computer to perform a method, the method comprising:
    selectively passing a network packet from an Internet Protocol kernel module to a filter upon determining that at least one filter hook is registered in the filter, wherein the Internet Protocol kernel module processes the network packet according to layer 3 Internet Protocol processing by using a plurality of layer 3 processes;
    selectively re-directing the network packet to a packet sniffer upon determining the packet is a member of a class of packets specified by the filter hook, wherein selectively re-directing the network packet occurs during layer 3 Internet Protocol processing of the network packet and occurs according to the filter hook that is inserted between the plurality of layer 3 processes in the Internet Protocol kernel module, wherein the plurality of layer 3 processes are processes for performing a plurality of different layer 3 services;
    copying the network packet into a buffer by the packet sniffer to store a duplicate copy of the network packet; and
    releasing the network packet for additional layer 3 processing, wherein the plurality of different layer 3 services include processes in addition to filtering, wherein releasing the network packet includes (i) sending the packet to the filter, and (ii) selectively providing the network packet to the Internet Protocol kernel module to resume processing upon determining there are no additional filter hooks registered in the filter.

2. The non-transitory computer-readable medium of claim 1, wherein prior to the selectively passing the method further comprising:
    receiving the network packet in the Internet Protocol kernel module to perform layer 3 Internet Protocol processing of the network packet in a protocol stack.

3. The non-transitory computer-readable medium of claim 2, wherein the protocol stack is a 7-layer Open Systems Interconnection (OSI) model protocol stack.

4. The non-transitory computer-readable medium of claim 1, further comprising:
    registering the filter hook prior to selectively passing the network packet.

5. The non-transitory computer-readable medium of claim 4, wherein the registering includes receiving an input from a tcpdump user command that specifies the filter hook.

6. The non-transitory computer-readable medium of claim 4, wherein the registering includes adding a callback of the filter hook to the filter, the filter hook being selected from a PHYSICAL_IN hook, a PHYSICAL_OUT hook, a FORWARDING hook, a LOOPBACK_IN hook, or a LOOPBACK_OUT hook.

7. The non-transitory computer-readable medium of claim 6, wherein the PHYSICAL_IN hook provides for selectively re-directing the network packet during inbound packet processing of the network packet by the Internet Protocol kernel module; and wherein the PHYSICAL_OUT hook provides for selectively re-directing the network packet during outbound packet processing of the network packet by the Internet Protocol kernel module.

8. The non-transitory computer-readable medium of claim 6, wherein the FORWARDING hook provides for selectively re-directing the network packet being forwarded through the computer to a destination computer.

9. The non-transitory computer-readable medium of claim 6, wherein the LOOPBACK_IN hook provides for selectively re-directing the network packet on a logical interface during inbound packet processing of the network packet by the Internet Protocol kernel module; and the LOOPBACK_OUT hook provides for selectively re-directing the network packet on a logical interface during outbound packet processing of the network packet by the Internet Protocol kernel module.

10. The non-transitory computer-readable medium of claim 1, wherein the selectively re-directing the network packet to the packet sniffer occurs without configuring a Network Interface Card (NIC) to use a promiscuous mode and between processes that perform layer 3 Internet Protocol processing of the network packet.

11. The non-transitory computer-readable medium of claim 1, wherein the packet sniffer is a Berkeley Software Distribution (BSD) Packet Filter (BPF) that is configured to receive the network packet during layer 3 Internet Protocol processing of the network packet.

12. A computing system, comprising:
an Internet Protocol (IP) logic including at least hardware and configured to process a packet according to a layer 3 Internet Protocol of a protocol stack and for forwarding the packet to a filter logic if the IP logic determines that at least one filter hook is registered in the filter logic, wherein the forwarding occurs during layer 3 Internet Protocol processing of the packet between processes that perform the layer 3 internet protocol processing, wherein the filter logic is configured to selectively send the packet to a packet sniffer if the packet is a member of a class of packets specified by a filter hook in a set of filter hooks, and wherein the processes that perform layer 3 internet protocol processing are processes for performing a plurality of different layer 3 services, wherein the packet sniffer is configured to copy the packet into a buffer to store a duplicate copy of the packet, wherein the filter logic is configured to release the packet for additional layer 3 processing by providing the packet to the IP logic to resume layer 3 processing upon determining there are no additional filter hooks registered in the filter logic, and wherein the plurality of different layer 3 services include processes in addition to filtering.

13. The system of claim 12, wherein the filter logic is configured to release the packet to the IP logic for additional layer 3 processing if the packet is not a member of the class specified by the filter hook, and wherein the filter hook is a packet sniffing filter hook.

14. The system of claim 12, wherein the packet sniffer is configured to filter the packet according to an attribute of the packet and to send the packet to the filter logic for additional processing after copying the packet into the buffer.

15. The system of claim 12, wherein the IP logic determines whether at least one filter hook is registered at a set of hook points during the processing of the packet, wherein each hook point in the set of hook points corresponds to a set of filter hooks.

16. The system of claim 15, comprising:
a registration logic for registering the filter hook by creating a callback to the filter hook in a set of filter hooks associated with a predetermined hook point, wherein the predetermined hook point is selected based, at least in part, on a type of the filter hook.

17. The system of claim 13, wherein the type of the filter hook is selected from a PHYSICAL_IN hook, a PHYSICAL_OUT hook, a FORWARDING hook, a LOOPBACK_IN hook, and a LOOPBACK_OUT hook, and wherein creating the callback is based, at least in part, on a tcpdump command from an application layer service.

18. A non-transitory computer-readable medium storing computer-executable instructions that when executed by a computer cause the computer to perform a method, the method comprising:

emulating a packet sniffing function by:
interrupting a layer 3 processing service at a filter hook point in a processing stack while processing a packet if at least one packet filter hook is registered for the filter hook point, wherein interrupting the layer 3 processing service occurs between at least two processes that comprise the layer 3 processing service, and wherein the at least two processes are processes for performing different layer 3 services;

forwarding the packet to a filter in response to interrupting the layer 3 processing service;

re-directing the packet to a packet sniffer if the packet is a member of a class of packets specified by the at least one packet filter hook wherein re-directing the packet occurs during layer 3 processing service and occurs according to the filter hook that is inserted between the at least two processes;

storing a duplicate of the packet in the packet sniffer for packet sniffing; and releasing the packet from the packet sniffer for additional layer 3 processing by providing the packet back to the layer 3 processing service to resume processing at a point after the filter hook point and upon determining there are no additional packet filter hooks registered in the filter hook point, wherein the different layer 3 services include processes in addition to filtering.

* * * * *

UNITED STATES PATENT AND TRADEMARK OFFICE
CERTIFICATE OF CORRECTION

| | | |
|---|---|---|
| PATENT NO. | : 8,848,554 B2 | Page 1 of 1 |
| APPLICATION NO. | : 13/041626 | |
| DATED | : September 30, 2014 | |
| INVENTOR(S) | : Reed | |

It is certified that error appears in the above-identified patent and that said Letters Patent is hereby corrected as shown below:

In the Specification

In column 1, line 22, delete "MC," and insert -- NIC, --, therefor.

In column 8, line 11, delete "PHSYICAL_IN" and insert -- PHYSICAL_IN --, therefor.

In column 8, line 64, delete "net6" and insert -- inet6 --, therefor.

In column 9, line 22, delete "net" and insert -- inet --, therefor.

In column 10, line 1, delete "PhysicalIn" and insert -- PhysicalIn --, therefor.

In column 12, line 47, delete "Iibpcap" and insert -- libpcap --, therefor.

In column 12, line 53, delete "Iibpcap" and insert -- libpcap --, therefor.

In the Claims

In column 18, line 19, in Claim 17, delete "13," and insert -- 16, --, therefor.

Signed and Sealed this
Twenty-eighth Day of July, 2015

Michelle K. Lee
*Director of the United States Patent and Trademark Office*